Nov. 7, 1967    R. M. FOX    3,351,536
LENS-DOME SOLAR DISTILLATION UNIT
Filed Dec. 2, 1964    2 Sheets-Sheet 1

INVENTOR.
ROBERT M. FOX
BY
ATTYS.

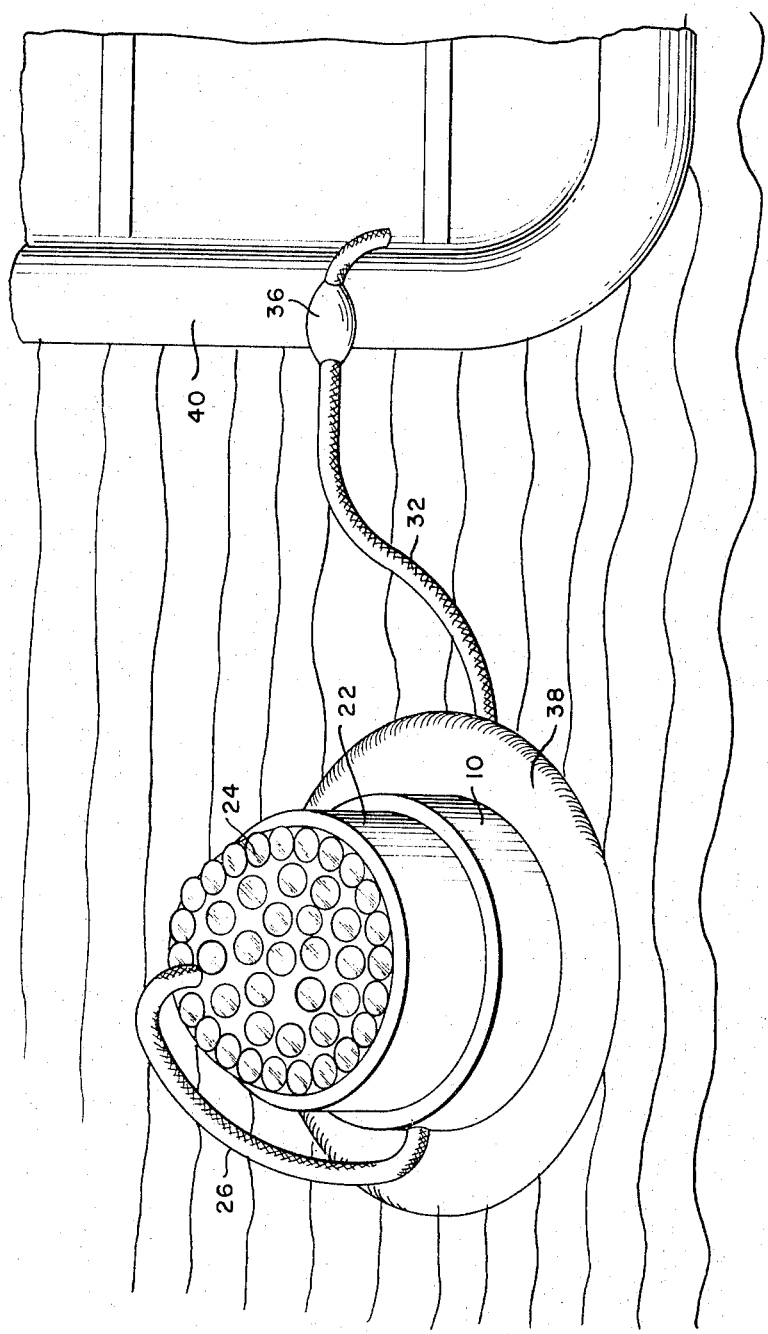

United States Patent Office 3,351,536
Patented Nov. 7, 1967

3,351,536
LENS-DOME SOLAR DISTILLATION UNIT
Robert M. Fox, 1035 Norman Drive, Apt. 104,
Annapolis, Md. 21403
Filed Dec. 2, 1964, Ser. No. 415,550
7 Claims. (Cl. 202—83)

ABSTRACT OF THE DISCLOSURE

A solar still for providing potable water from seawater comprising an evaporation chamber covered by a transparent plastic dome containing a plurality of integrally formed magnifying lenses. Oriented below the evaporation chamber and interconnected therewith is a condensation chamber having walls of high heat conducting metal the outsides of which are in contact with the seawater when the still is floated upon the surface. A floating ring surrounds the circumference of the condensation chamber to stabilize the still upon the surface of the sea.

---

The invention described herein may be manufactured and used by or for the Government of the United States of America for governmental purposes without the payment of any royalties thereon or therefor.

This invention relates to a lens-dome solar distiller for converting sea water or other non-drinkable water to pure drinking waater. A pilot forced down at sea or in a remote area or survivors of a ship afloat on life rafts often would survive except for the absence of potable water.

There are two accepted methods of producing potable water for emergency use. One is by means of chemical treatment and filtration and the other is by means of an inflatable solar distillation unit.

The drawback of the chemical treatment is the limitation in the amount of potable water that may be produced. The amount of potable water that may be produced is a direct function of the amount of chemical available. A standard one man pack contains only enough chemical to convert about 4 quarts of water to potable water. In addition to the quantity limitation the chemical treatment tends to cause an increase in the pH factor of the water above what is normal for potable water.

The inflatable solar distillation unit while capable of producing more potable water than the chemical treatment has certain disabilities. The balloon type construction of the inflatable solar distillation is easily damaged. The outer shell is made of vinyl which is a poor condensing surface due to the low thermal conductivity of vinyl. Besides the poor condensing surface, air is used as the condensing medium. When the sun is most direct and least inhibited by clouds, resulting in the best conditions for distillation, the air temperature is the highest thus causing the poorest condensing conditions. This is true because air has a lower specific heat and a much higher specific volume than, for example, water. The inflatable solar distillation unit also uses positive air pressure on the inside of the unit which causes the temperature necessary for evaporation to be higher.

The purposes of this invention is to provide a lens dome solar distillation unit which embraces all of the advantages of similarly used inflatable solar distillation units but which possesses none of the aforementioned disadvantages. To achieve this the instant invention utilizes material of a much sturdier nature as a condensing element, material of a higher thermal conductivity, and a vacuum within the distiller thus enabling a lower temperature for evaporation.

An object of the present invention is to provide drinking water for survivors on life rafts with a minimum of complexity and effort and maximum duration, ruggedness and reliability.

Another object is the provision of a distilling unit wherein there is no limit as to the quantity of drinking water it can produce.

A further object of the invention is the provision of a distiller constructed rugged enough to withstand extreme conditions of handling.

Still another object is to provide a distiller having extremely low thermal conductivity so as to reduce heat loss to the surrounding air to a minimum.

Yet another object of the present invention is the provision of rapid condensation of vaporized sea water.

A still further object is to concentrate the sun's radiation on the sea water to cause a faster evaporation and resulting condensation rate.

With these and other objects in view, as will hereinafter more fully appear, and which will be more particularly pointed out in the appended claims, reference is now made to the following description taken in connection with the accompanying drawings in which:

FIG. 3 shows a view of the distillation unit in its most usual environmental use.

Figure 1:
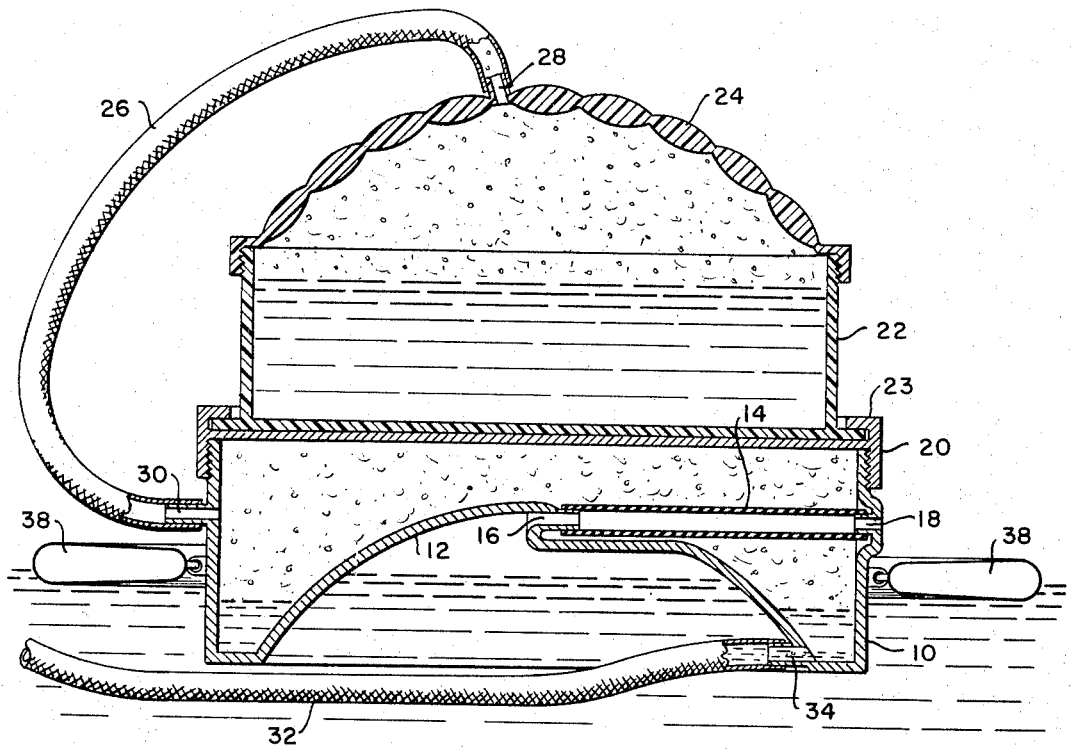
FIG. 1 shows a view of a lens-dome solar distillation unit in operation.

Referring now to the drawings, wherein like reference numerals designate like or corresponding parts throughout the several views, there is shown in FIG. 1 a condenser can 10. The bottom 12 of the condenser can 10 is arched inwardly to enable maximum surface of the can to be in contact with sea water. A vent tube 14 is connected to a fitting 16 in the bottom 12 of the can with the other end of the vent tube 14 connected to a fitting 18 in the side of the condenser can 10. The condenser can is sealed at its top by means of a top 20. The can top 20 screws onto the condenser can 10 by use of a threaded connection and suitable sealing means such as a plastic or rubber gasket to make the top of the condenser can air tight. Both the condenser can and its top 20 are made of high conductive material such as copper or aluminum.

Secured to the top 20 is a sea water evaporating container 22. The condenser can top 20 has a lip 23 around its periphery which has slots therein. Corresponding projections in the evaporating container 22 fits into the slots in lip 23 and when the container is rotated the projections under the lip 23 secure the evaporating container 22 to the condenser can top 20.

A lens-dome 24 is sealed to the sea water evaporating container 22 via a threaded connections and suitable sealing means such as an O ring or plastic or rubber gasket. A vapor tube 26 connects to a nipple 28 protruding from the lens-dome 24 and to a fitting 30 in the side of the condenser can 10. The lens-dome 24 is constructed from rigid, clear plastic with the lenses molded as an integral part of the dome unit while the sea water evaporating container is made of opaque non-gloss, black plastic.

An evacuation tube 32 is secured to a fitting 34 in the bottom 12 of the condenser can 10. Inserted in the evacuation tube is a squeeze-bulb air ejector-distillate pump 36 shown and described later when referring to FIG. 3.

A stabilizing flotation tube 38 is fastened to the exterior of the condenser can 10. The flotation tube, normally deflated in storage, is inflated so as to hold the distillation unit afloat stabilized and upright in water.

Figure 2:
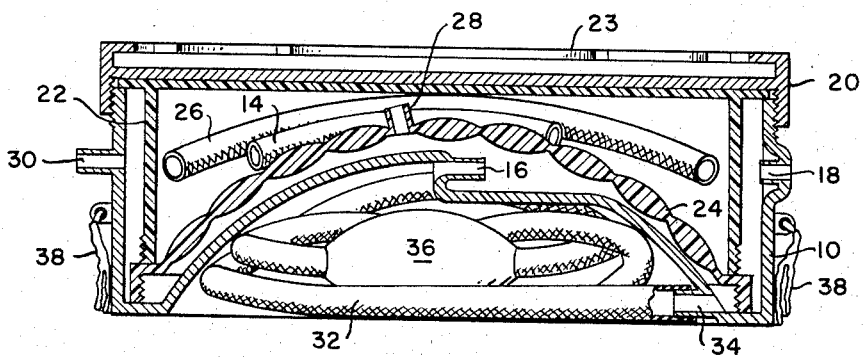
FIG. 2 shows another view of the distillation unit in a compact storage condition.

FIG. 2 shows the lens-dome solar distillation unit in a compact storage condition. The lens-dome 24 is first placed within the condenser can 10. The vent tube 14 and vapor tube 26 is then placed upon the lens-dome 24. The sea water evaporating container 22 is inverted and then placed in the condenser can 10. The condenser can top 20 is then threaded into place to close the top of the condenser can 10. The evacuation tube 32 and squeeze-bulb 36 is folded within the recess formed by the arched bottom 12 of the condenser can 10. It is to be noted that the bottom fitting 16 and side fitting 18 are so constructed as to not interfere with the lens-dome 24 and sea water container 22 when inserted within the condenser can 10 for purposes of storage. The stabilizing flotation tube 38 is deflated and lies folded against the sides of the condenser can 10 when in the storage condition.

Referring to FIG. 3 the lens-dome solar distillation unit is shown in its usual operating environment. The stabilizing flotation tube 38 keeps the distillation unit afloat and stabilized. The evacuation tube leads through the squeeze-bulb 36 to a life raft 40 wherein survivors at sea are able to obtain the fresh water distilled from sea water for drinking purposes.

Sea water is placed in the evaporating container 22. By use of the squeeze-bulb 36 air is evacuated from the evaporating container 22 through the evacuation tube 32, condenser can 10 and vapor tube 26. The lens-dome 24 concentrates the sun's rays on the sea water contained in the evaporating container 22. Being under a vacuum the temperature needed for an evaporation is lowered. The vacuum within the distillation unit is such that the squeeze-bulb is held in a collapsed position. The lens-dome 24 and sea water evaporating container 22 are made of material having an extremely low thermal conductivity which reduces the heat loss to the surrounding air to a minimum and thus utilizes the radiant heat of the sun in a cumulative matter.

Water vapor passes through the vapor tube 26 to the condenser can 10. Since the condenser can is made of high thermal conductive material and is partially submerged in the sea, the heat from the vapor is rapidly transferred to the sea resulting in the formation of fresh distilled water by condensation. The bottom 12 of the condenser can 10 is arched to give a greater surface for heat transfer and therefore condensation of the water vapor. So that air will not be trapped in the recess formed by the bottom 12, which would keep the cold sea water out of contact with the metal surface, air is allowed to escape through the vent tube 14 to allow the distillation unit to float lower in the water.

Sea water is an excellent condensing medium since the sea constitutes an infinitely large heat-sink. The temperature of the sea remains essentially constant for a particular location and time of the year and is essentially unaffected by varying air temperatures. Also because of its relatively low specific volume and high specific heat, water serves as a much better heat removing medium then air.

At regular intervals the squeeze-bulb 36 is pumped until all of the condensed distilled water is pumped into a receiver and the vacuum is restored to a point where the bulb 36 no longer restores itself to its original elliptical shape. In this manner the distillation unit functions more efficiently, because as the distillate accumulates in the bottom of the condenser can 10 the exposed heat transfer surface diminishes and the vacuum is dissipated.

The material used in the construction of the condenser can is either copper or aluminum. Both of these materials have very high thermal conductivity. The thermal conductivity of copper is 224 B.t.u. per hour per square foot for a thickness of one foot and a difference of temperature of one degree centigrade and 117 for aluminum. Copper has the obvious advantage over aluminum in that the thermal conductivity of copper is almost twice that of aluminum. Aluminum, however, is lighter in weight, harder, more resilient and generally stronger. Both materials are highly corrosion resistant in the presence of sea water.

Every component of the assembled distiller, including all tubing, should be capable of withstanding at least 15 pounds per square inch differential pressure. The squeeze bulb should be able to restore itself to its original shape from the squeezed or compressed shape against a pressure differential of at least 3 p.s.i.; that is, with the higher pressure on the outside of the squeeze bulb. This will depress the evaporation temperature of the water to about 200° F.

Obviously many modifications and variations of the present invention are possible in the light of the above teachings. It is therefore to be understood that within the scope of the appended claims the invention may be practiced otherwise than as specifically described.

What is claimed is:
1. A solar distillation unit comprising:
   a condenser can;
   an evaporating container secured to the top of the said condenser can;
   a lens-dome secured to the top of the said evaporating container;
   means fluidly communicating the space adjacent the lens-dome with the space in the upper portion of the condenser can;
   means for evacuating the said condenser can whereby vapor formed in the container and transferred to the condenser can be condensed into potable water;
   an inflatable stabilizing floatation tube secured to said condenser can.

2. A solar distillation unit as defined in claim 1 wherein the said condenser can is recessed inwardly whereby the area of condensing surface is increased.

3. A solar distillation unit as defined in claim 2 wherein the said lens-dome comprises a rigid, clear, plastic with lenses molded as an integral part of the dome whereby radiations of the sun are concentrated on the sea water to cause a more rapid temperature rise and evaporation rate.

4. A lens-dome solar distillation unit comprising:
   a condenser can made of a high thermal conductivity material having an inwardly recessed bottom to provide maximum condensing surface whereby the water vapor is rapidly condensed to maintain the vacuum within the distillation unit;
   a seawater evaporating container made of a low thermal conductivity material secured to the top of said condenser can;
   a lens-dome secured to said evaporating container for concentrating the sun's radiation within said evaporation container;
   means fluidly connecting the space within said evaporation container with the space in the said condenser can, whereby seawater is evaporated in said evaporator container and then condensed to potable water in said condenser can; and
   a squeeze-bulb air ejector distillate pump for evacuating the space within said seawater evaporating container and condenser can whereby the temperature needed for evaporation is lowered and potable water removed for drinking by survivors on a life raft.

5. A lens-dome solar distillation unit as defined in claim 4 and further comprising means located in the center of the indented bottom for allowing air in the said indentation to escape whereby sea water fills the indentation to allow the distillation unit to float lower in the water for more efficient condensation of the evaporated sea water.

6. A lens-dome solar distillation unit as defined in claim 5 and further comprising a stabilizing flotation tube secured to the said condenser can whereby the said distillation unit can be floated next to a life raft.

7. A lens-dome solar distillation unit as defined in claim 6 wherein the elements are provided with means capable of disassembly from the form of a solar distillation unit and capable of reassembly for compact storage.

References Cited

UNITED STATES PATENTS

| | | |
|---|---|---|
| 1,302,363 | 4/1919 | Graham. |
| 1,544,029 | 6/1925 | Nelson _____ 202—152 |
| 2,342,062 | 2/1944 | Schenk. |
| 2,820,744 | 1/1958 | Lighter. |
| 2,902,028 | 9/1959 | Manly. |
| 3,075,891 | 1/1963 | Elam. |

NORMAN YUDKOFF, *Primary Examiner.*

D. EDWARDS, *Assistant Examiner.*